United States Patent [19]
Gerber

[11] 3,781,907
[45] Dec. 25, 1973

[54] APPARATUS FOR EXPRESSING WRITING FLUID FROM A PLOTTING PEN

[75] Inventor: Heinz Joseph Gerber, West Hartford, Conn.

[73] Assignee: The Gerber Scientific Instrument Company, South Windsor, Conn.

[22] Filed: Jan. 17, 1972

[21] Appl. No.: 218,143

[52] U.S. Cl.................... 346/140, 417/42, 417/519
[51] Int. Cl. ........................................... G01d 15/16
[58] Field of Search............................ 346/140, 29; 417/569, 42, 519

[56] References Cited
UNITED STATES PATENTS

| 2,168,850 | 8/1939 | Towler et al...................... 417/569 |
| 3,169,821 | 2/1965 | Miller ................................ 346/140 |
| 3,510,878 | 5/1970 | Johnson................................. 346/1 |

FOREIGN PATENTS OR APPLICATIONS

| 637,462 | 5/1950 | Great Britain..................... 346/140 |

Primary Examiner—Joseph W. Hartary
Attorney—John C. Linderman

[57] ABSTRACT

In a plotting device in which a plotting pen and a recording medium move relative to one another while the pen produces a line trace on the medium, a fluid pump is connected to the plotting pen and forcibly expresses writing fluid from the pen at a rate proportional to the rate of relative movement between the pen and the recording medium. In one such plotting device, a recording medium such as a strip of plotting paper, is transported between two supply rolls by means of a motor-driven plotting drum. The plotting pen is transported laterally of the strip of plotting paper and over the plotting drum by means of a motor-driven carriage. The motors of the plotting drum and the carriage receive plotting commands from a digital computer and a velocity signal circuit in the plotting device derives a velocity signal proportional to the relative movement generated by the motors. The velocity signal is utilized to control the speed of the fluid pump which is specially constructed to have a linear speed versus flow rate characteristic.

10 Claims, 7 Drawing Figures

3,781,907

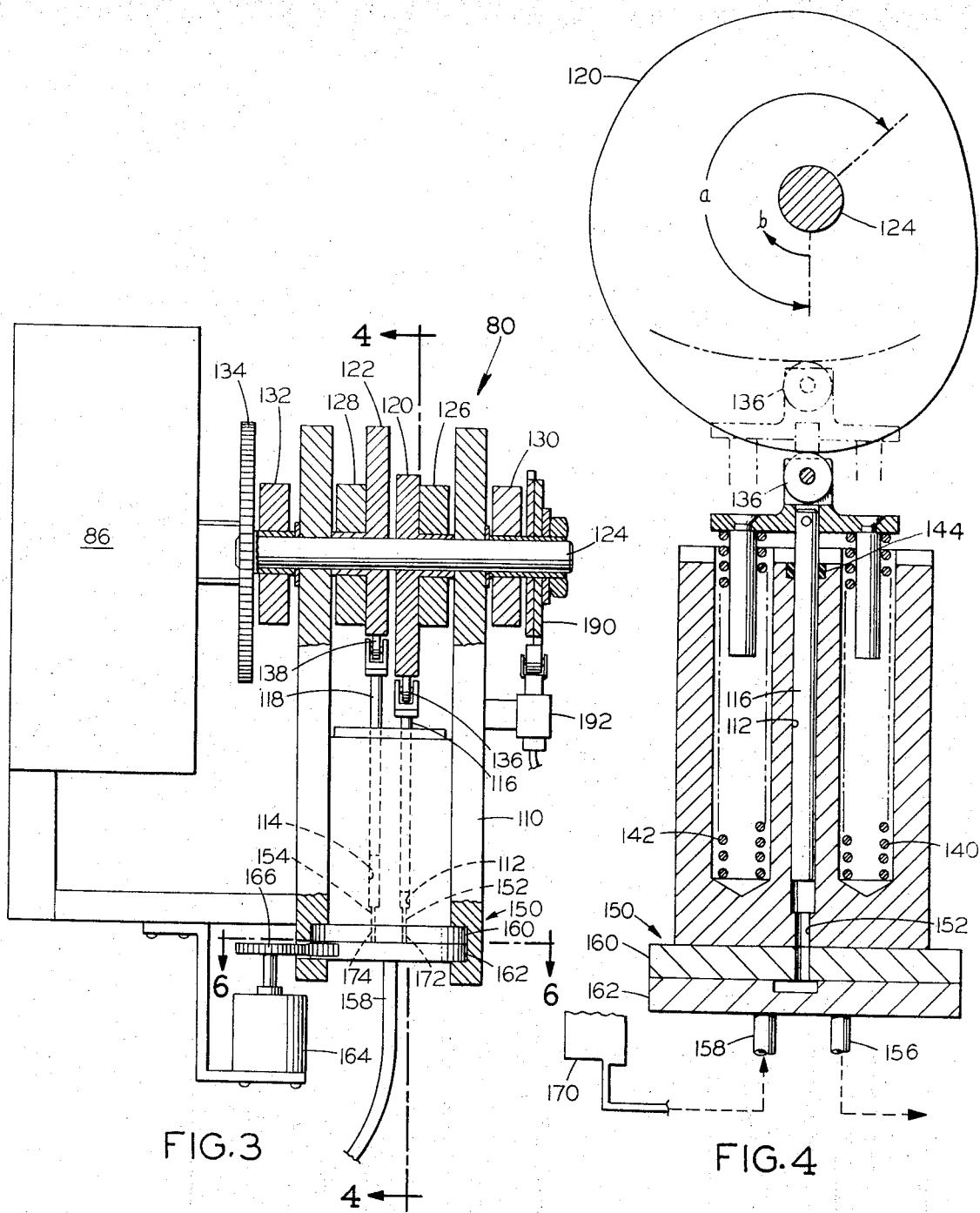

3,781,907

APPARATUS FOR EXPRESSING WRITING FLUID FROM A PLOTTING PEN

BACKGROUND OF THE INVENTION

The present invention relates to recording or motor-driven plotting devices in which a plotting pen and recording medium are moved relative to one another to produce line traces defining graphical information. More particularly, the invention relates to apparatus for expressing a writing fluid from a plotting pen so that the quality of the traces and the graphic information does not deteriorate at higher plotting speeds.

As the state of the art in the field of plotting devices progresses and the maximum speeds of the plotting devices increase, the transfer of the writing fluid from the plotting pen onto the recording medium becomes a problem. As the plotting speed increases beyond the capacity of a standard wetting pen through which the writing fluid is drawn by capillary action, the character of the lines produced by the pen deteriorates. The intensity and width of the lines decrease as the quantity of writing fluid deposited per unit length of line decreases. To limit the deterioration in quality, pressurized ball point pens have been employed; however, due to limitations of the ball point, such as its tendency to skip, a high quality printout having high contrast and clarity cannot be achieved at high plotting speeds, for example, 700 inches per minute and higher. Also, uniform line characteristics at various plotting speeds are desirable. Even though the traces may be clear, variations in the line widths due to different plotting speeds may be unacceptable in, for example, making master transparencies for printed circuit components.

It is, accordingly, a general object of the present invention to disclose apparatus for expressing a writing fluid from a plotting pen to produce uniform, traces at different plotting speeds and high quality traces at higher plotting speeds.

SUMMARY OF THE INVENTION

The present invention resides in apparatus for expressing writing fluid from a plotting pen onto a recording medium while the pen and recording medium are moved relative to one another in a plotting device. In such plotting devices, command signals generated from "on line" data or data derived from memory devices such as magnetic or punched paper tape are supplied to the plotting device to produce a prescribed relative movement between the plotting pen and the recording medium.

The apparatus of the present invention comprises velocity signal generating means which is connected with the plotting device and produces a velocity signal representative of the rate of movement of the pen and the recording medium relative to one another in the plotting device. The signal generating means may include a rate sensor, such as a pulse rate tachometer, which receives the command signals supplied to the plotting device. The apparatus also includes fluid pumping means connected to the plotting pen and the velocity signal generating means and which responds to the velocity signal to force writing fluid from the plotting pen at a flow rate corresponding with the rate of movement of the pen and recording medium relative to one another in the plotting device.

The pumping means comprises a fluid pump having a discharge duct connected to the plotting pen to deliver writing fluid to the pen, and a pump motor driven at a rate proportional to the velocity signal produced by the generating means. The pump is connected to the motor through a gear reduction unit and operates at a low speed consistent with the small flow rates required of a plotting pen. The pump employs reciprocating pistons which are driven by means of cams that provide a linear speed versus a flow rate characteristic. By driving the pump having such linear flow rate characteristics at a speed proportional to a desired flow rate, more particularly, a flow rate directly proportional to the speed of relative movement between the pen and the recording medium, line traces on the recording medium retain the same high quality at all plotting speeds. The plotting pen is a wetting-type pen which has a capillary tube at the writing tip through which the writing fluid is forced during the plotting operation. The pen is provided with an electrically oscillated filament to clean the capillary tube as needed.

BRIEF DESCRIPTION OF THE DRAWINGS

FIG. 3 is a cross-sectional view of a fluid pump utilized in the plotting device of FIG. 1.

FIG. 4 is an enlarged sectional view of the fluid pump taken along the line 4—4 of FIG. 3.

DESCRIPTION OF THE PREFERRED EMBODIMENTS

Figure 1:
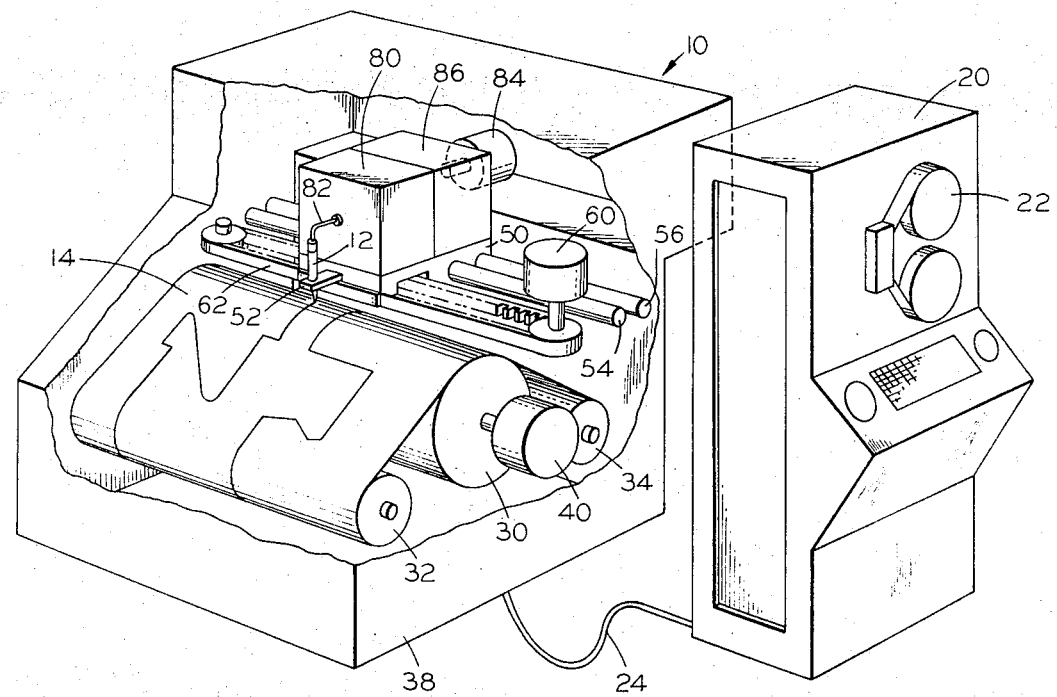
FIG. 1 is a perspective view of a plotting device embodying the apparatus for expressing writing fluid from the plotting pen in accordance with the present invention.

FIG. 1 shows in a perspective view a plotting device, generally designated 10, in which a plotting pen 12 and a recording medium 14 are moved relative to one another while a writing fluid is expressed from the pen onto the medium 14 at a rate proportional to the relative movement or velocity between the pen 12 and the medium 14. The plotting device 10 receives plotting commands from a digital computer 20 as the computer reads information from a digital memory tape 22. The particular operation performed by the computer in processing the information from the tape 22 forms no part of the present invention and it is sufficient for understanding the present invention to state that after utilizing the information from the tape, the computer transmits command signals which control the operation of the plotting device 10 through a command signal cable 24 and cause specified graphic information to be recorded on the medium. The command signals may be in either digital or analog form, but for the purposes of description in the present specification, it will be assumed that digital signals are employed.

The recording medium 14, which is shown as a strip of plotting paper, is trained over a plotting drum 30 which engages the strip with sprockets or other means and translates the strip longitudinally of itself back and forth between two supply rolls 32 and 34 located parallel to the drum and at opposite sides of the drum. The drum 30 is mounted for rotation in the housing 38 of the plotting device 10 by means bearings (not shown) and is rotated by a variable speed drive motor 40 connected directly to the mounting shaft for the drum. The supply rolls 32 and 34 are also rotatably mounted in the housing 38 and are driven in opposition to one another by torquing motors (not shown) so that the strip of the recording medium 14 trained over the plotting drum 30 remains taut as the medium is paid on and off the two supply rolls.

The plotting pen 12 is mounted to a plotting head 50 so that the writing tip of the pen 12 can be positioned in writing contact with the recording medium 14 in substantially perpendicular relationship to the medium resting on the plotting surface of the drum 30. For this purpose the pen 12 is mounted on a cantilevered arm 52 which is pivotally mounted in the head 50 so that the pen 12 can be lowered into writing contact with the recording medium 14 or lifted away from the medium when no trace is desired. The plotting head 50 is supported on a pair of parallel rails 54 and 56 fixedly mounted to the housing 38 and extending parallel to the axis of rotation of the plotting drum 30 so that the plotting head 50 and the pen 12 can be moved transversely of the recording medium 14. A variable speed drive motor 60 is connected in driving relationship to the head 50 by means of a toothed drive belt 62 so that the motor 60 causes the head 50 and pen 12 to move transversely of the recording medium 14 while the drive motor 40 causes the plotting drum 30 to move the recording medium 14 back and forth in the longitudinal direction. It will be understood that the drive motors 40 and 60 cause the recording medium 14 and the plotting head 50 with the pen 12 to be moved relative to one another along mutually perpendicular directions, the longitudinal direction in which the recording medium is moved by the plotting drum 30 and the motor 40 being normally associated with an X command axis and the lateral direction along which the plotting head 50 and pen 12 are moved relative to the medium being associated with a Y command axis. The pivotal motions of the cantilevered arm 52 which raise and lower the pen 12 over the recording medium are designated Z axis commands since the vertical motions of the pen 12 are generally perpendicular to the longitudinal motions of the recording medium 14 and the lateral motions of the pen 12.

Figure 2:
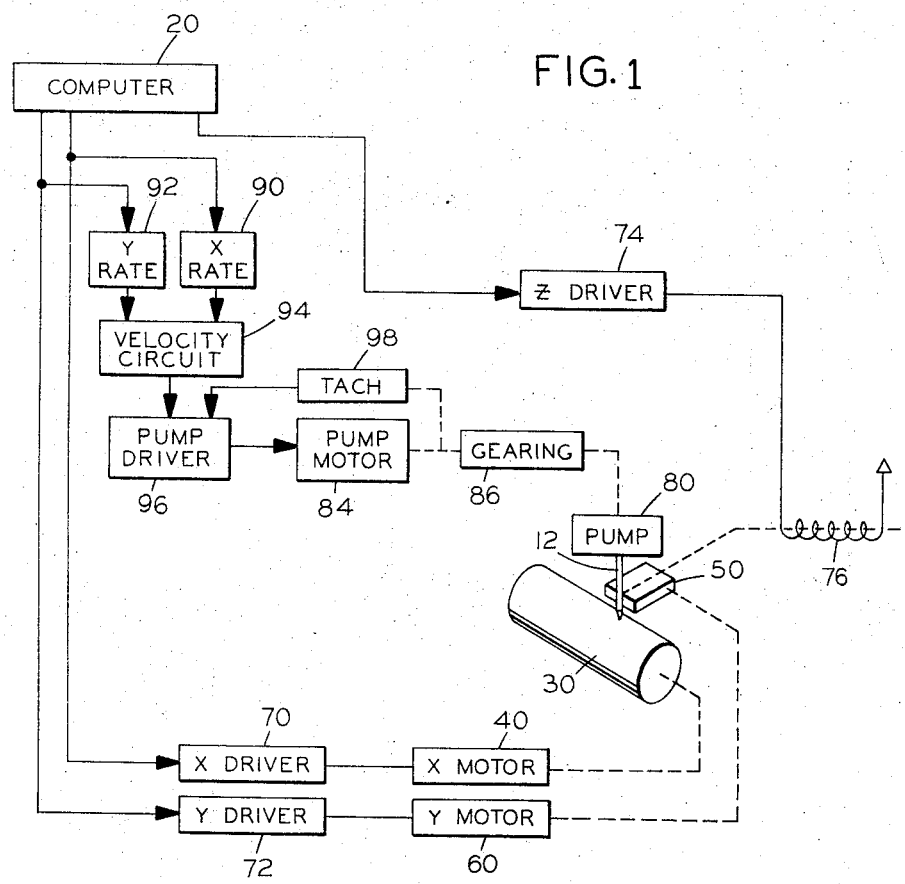
FIG. 2 is a schematic diagram showing control components within the plotting device shown in FIG. 1.

Turning briefly to FIG. 2, the control signal channels from the digital computer 20 to the components associated with the X, Y, and Z axes of the plotting device 10 are shown in a schematic diagram. Motion commands in the form of digital motor pulses and sign information are transmitted respectively to X and Y drivers 70 and 72. The drivers 70 and 72 may be formed by digital-to-analog servocontrols such as disclosed in the co-pending application Ser. No. 169,263, filed Aug. 5, 1971, having the same assignee as the present application. The drivers 70 and 72 apply electrical drive signals to the variable speed drive motors 40 and 60 and the motors accordingly produce the relative movement between the pen 12 and the recording medium 14. The Z axis commands are transmitted from the digital computer 20 to a Z axis driver 74 and actuate a solenoid 76 to cause the pen 12 to be pivotally lowered against the plotting drum 30 and in contact with the recording medium translated on the plotting drum. The Z axis driver 74 may be a simple transistor amplifier and the pen 12 may be biased upwardly out of contact with the recording medium 14 by means of a biasing spring (not shown). It will be understood that by appropriate commands to the drivers 70, 72, 74, the plotting pen 12 and recording medium 14 are moved relative to one another so that the writing tip of the pen may be stroked over the recording medium in a controlled manner and produce any type of graphic or trace including geometric figures, letters, numbers and curves.

As shown in FIGS. 1 and 2, the pen 12 is supplied with writing fluid by means of a fluid pump 80 which is connected to the pen through a flexible tube 82. The fluid pump 80 is operated by a pump motor 84 through a gear reduction unit 86. The pump 80, the pump motor 84 and the gear unit 86 are all mounted to the plotting head 50 of the plotting device 10. The common mounting of the pen, pump and motor on the head 50 permits the interconnecting flexible tube 82 to be relatively short and eliminates compliance in the conduits connecting the pump and the pen which compliance might produce transients affecting the flow rates of the writing fluid and the quality of the line traces on the recording medium 14. The reservoir for the writing fluid may be embodied in the housing of the pump 80 or mounted separately to the plotting device 10.

The control signals which regulate the flow of writing fluid from the pump 80 are derived from the command signals applied to the drivers 70 and 72 by means of X and Y pulse rate tachometers 90 and 92 respectively. The tachometer 90 detects the motor pulse rate of the command signals applied to the X driver 70 and the tachometer 92 detects the motor pulse rate of the command signals applied to the Y driver 72. The pulse rate signals from the tachometers 90 and 92 are applied to a velocity signal generating circuit 94 which continuously computes the total relative velocity of the plotting pen 12 and recording medium 14. The generating circuit 94 produces a signal proportional to the total velocity and applies that signal to a pump driver 96, which may be a standard variable gain, closed loop amplifier, that operates the pump motor 84. The driver 96 also receives a feedback signal proportional to the speed of the pump motor 84 from a motor tachometer 98. The pump motor 84 is, therefore, operated in a closed loop servosystem which maintains the output speed of the motor 84, and also the gearing 86, proportional to the relative velocity of the recording pen 12 and recording medium 14. The pump 80 is designed to have linear flow versus speed characteristics so that the writing fluid flows from the pump 80 through the plotting pen 12 and is expressed from the writing tip onto the recording medium 14 at a rate which is proportional to the relative velocity of the pen in the medium. The gain of the pump driver 96 is made adjustable so that the proportional flow rate characteristic of the fluid pumping system can be varied for different pen tip sizes, writing fluid viscosities, paper absorption characteristics and line characters, that is heavy or light. The driver may be designed so that the adjustment of its gain is either manually effected or is controlled directly from the digital computer 20.

It is important that the fluid pump 80 have the linear flow versus speed characteristic and be able to produce a continuous flow of writing fluid at the controlled rate. If the linear flow characteristics are not substantially met, the character and quality of the line traces on the recording medium may vary with undesirable results at different plotting speeds. If the pump is not capable of producing a smooth and continuous flow of writing fluid, the trace on the recording paper may be broken at stations where the flow rate is momentarily interrupted.

One embodiment of the pump 80 which has the necessary characteristics is shown in FIGS. 3-6. The pump is a piston pump and includes a housing 110 in which fluid displacement chambers are formed between the ends of two cylinders 112 and 114 and two reciprocating pistons 116 and 118 mounted respectively in the cylinders 112 and 114. The pistons 116 and 118 are driven respectively by cams 120 and 122 which are fixedly mounted to the rotatable drive shaft 124 by means of clamps 126 and 128 respectively. The drive shaft 124 is rotatably mounted in the upper portion of the housing 110 by means of clamps 130 and 132 and is driven by the gear unit 86 through a gear set 134. Cam followers 136 and 138 pinned to the upper ends of pistons 116 and 118 respectively engage the cams 120 and 122. As shown in FIG. 4, the cam follower 136 is biased upwardly into contact with the cam 120 by means of two return springs 140 and 142 mounted in parallel relationship with the piston 116. The piston 116 is therefore reciprocated in the cylinder 112 by the cam 120 and the return springs 140 and 142 as the cam follower 136 engages the profile of cam 120. The upper end of the piston 116 is sealed by means of an O-ring seal 144. The piston 118 is operated by the cam 122 in the same manner.

The profile of the cam 120 shown in FIG. 4 and similarly the profile of the cam 122 are designed to cause the pistons 116 and 118 to move in a reciprocating manner within the cylinders 112 and 114 and to reduce the volumes of the displacement chambers in the cylinders by amounts proportional to the rotation of the shaft 124 during overlapping portions of the reciprocation cycles. More specifically, the segment of the profile on the cam 120 which provides the proportional displacement of the piston 116 and reduction of the fluid displacement chamber volumes as the drive shaft 124 rotates in the direction of the arrow $b$ subtends the arch $a$ greater than 180° as shown in FIG. 4. The remaining segment of the cam profile permits the piston 116 to move upwardly to the phantom position of the follower 136 indicated in FIG. 4 and ingest writing fluid for the next pumping stroke. The end portions of the remaining cam profile segment may provide a dwell in the piston motions. The profile of the cam 122 is the same as that on cam 120. The cams 120 and 122 are fixedly mounted to the drive shaft 124 at rotational positions which are substantially 180° apart so that the proportional stroking segment of at least one or the other of the cams is engaged with a cam follower at each rotational position of the drive shaft 124 and, therefore, at least one of the reciprocating pistons will always provide a proportional reduction in the displacement chamber volume and a flow rate proportional to shaft speed.

In order to connect the cylinders 112 and 114 to the plotting pen 12 at the appropriate times during the reciprocation cycles of the pistons, a switching valve 150 is connected between the fluid passageways 152 and 154 leading respectively to the cylinders 112 and 114 and the discharge and inlet ducts 156 and 158 of the pump. The switching valve 150 is an electrically actuated valve comprised of a mounting plate 160 and a rotatable plate 162 which contain porting ducts mating with the passageways 152, 154 and the ducts 156 and 158. The plates 160 and 162 have contacting, lapped surfaces which are clamped together to prevent leakage of the writing fluid and the plate 162 is rotated relative to the plate 160 by means of a rotary solenoid 164 and a gear 166. A portion of the outer periphery of the plate 162 bears gear teeth mating with the gear 166 as shown most clearly in FIG. 6.

The inlet duct 158 is a flexible duct and connects with the writing fluid reservoir 170 to supply fluid to the displacement chambers of the pump. The reservoir 170 is preferably mounted on the plotting head with the pump 80 and may take the form of a cartridge or collapsible container. The discharging duct 156 is also flexible and connects directly with the duct 82 leading to the plotting pen as shown in FIG. 1.

Figure 6:
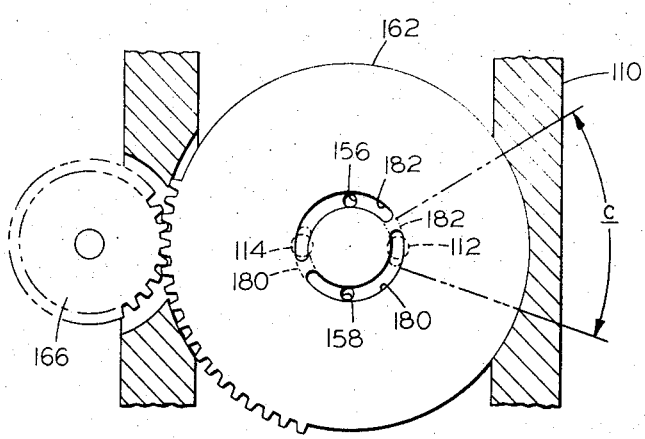
FIG. 6 is a sectional view of the fluid switching valve taken along the line 6—6 in FIG. 3.

As shown in FIG. 6, the rotatable plate 162 of the switching valve 150 contains two arcuate cutouts 180 and 182 into which the inlet duct 158 and discharge duct 156 are connected respectively. The stationary plate 160 mounted to the housing 110 of the pump contains conduits 172 and 174 which connect directly through the passageways 152 and 154 respectively to the cylinders 112 and 114. When the rotary solenoid 164 rotates the gear 166, the rotatable plate 162 is moved through an arch $c$ so that the arcuate cutouts 180 and 182 are moved between the positions shown and the phantom positions indicated. As a result, the cylinder 112 connects with the arcuate cutoff 180 at one position of the rotatable plate 162 and with the other arcuate cutout 182 at the other position of the plate 162. Conversely, the cylinder 114 connects with the arcuate cutout 182 at the one position of the plate 162 and with the cutout 180 at the other position of the plate 162. Accordingly, the inlet and discharge ducts 158 and 156 are alternately connected to the cylinder 112 in sequence and at the same time are alternately connected to the cylinder 114 in the reverse sequence.

Figure 5:
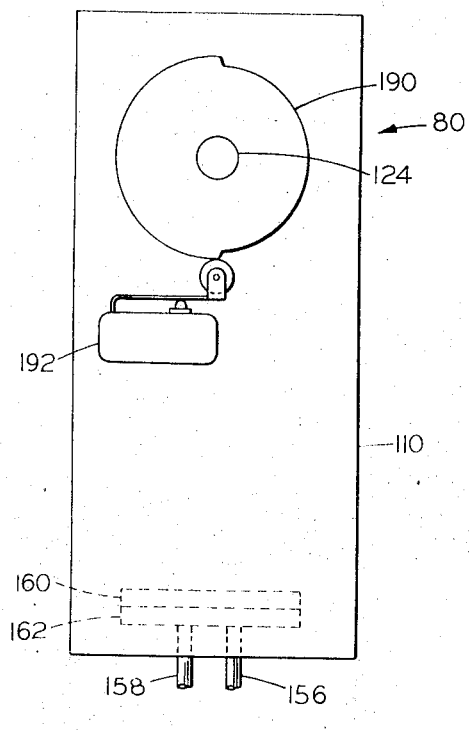
FIG. 5 is an end elevational view of the fluid pump shown in FIG. 3.

It will be readily understood that since the cams 120 and 122 displace the pistons 116 and 118 at proportional rates during a portion of the drive shaft rotation greater than 180° and since the cams are phased on the drive shaft 124 so that at least one of the cams is displacing one of the pistons in proportional fashion at each rotational position of the drive shaft 124, a flow rate proportional to the shaft rotation can be derived from the discharge conduit 156 at each rotational position of the drive shaft provided that the switching valve 150 is actuated at appropriate times during each revolution of the drive shaft. To this end, a switching cam 190 shown in FIGS. 3 and 5 is fixedly mounted to the one end of the drive shaft 124 and a microswitch 192 actuated by the cam 190 is secured to the housing 110 of the pump 80. The profile of the cam 190 causes the microswitch 192 to close during the 180° of rotation of the drive shaft 124 in which the cam 120 displaces the piston 116 and fluid within cylinder 112, and in this manner actuates the rotary relay 164 to cause the switching valve 150 to be positioned so that the discharge port 156 and the cylinder 112 are in fluid communication and the inlet port 158 and the cylinder 114 are in fluid communication. During the remaining 180° of rotation, the cam 190 opens the microswitch 192 and the rotary solenoid 164 repositions the switching valve 150 so that the porting through the valve reverses the fluid communications between the cylinders and the inlet and discharge ports.

It will be noted that the portions of the cams 120 and 122 providing the proportional flow rates extend over more than 180° of the cam profiles and the cams are phased so that the profile segments providing the proportional flows overlap and simultaneously produce proportional flows during two portions of each shaft revolution. The switching cam 190 is mounted to the drive shaft 124 so that the reversal in the porting between the cylinders and the inlet and discharge ports occurs while both cylinders are simultaneously producing the proportional flow rates. Accordingly, by rapidly switching of the discharge port 156 between the two cylinders, a continuous, proportional flow to the plotting pen is produced at all rotational positions of the drive shaft 124 and no hiatus in the flow is observed at the end of each piston stroke.

Figure 7:
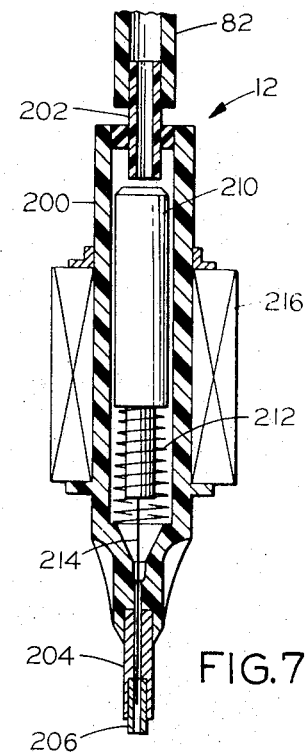
FIG. 7 is a cross-sectional view of the plotting pen utilized in the plotting device in FIG. 1.

FIG. 7 shows one embodiment of the plotting pen 12 utilized in the present invention to deposit the pumped writing fluid on the recording medium 14. The plotting pen 12 is a wetting pen, that is, a pen provided with a capillary tube at the writing tip through which the writing fluid passes as the writing tip is drawn over a recording medium. In this respect, the term "writing fluid" is intended to include inks, paints, photo-resists, etchants, and other fluids which are capable of providing line traces on recording mediums such as paper, photosensitive film, metal plates or other mediums on which line traces are desired.

The plotting pen 12 is composed principally of a non-magnetic, tubular housing 200 composed, for example, of a plastic material having a hollow central bore extending from a fluid feed tube 202 connecting with the flexible tube 82 (FIG. 1) to a capillary tube 204 mounted at the writing tip of the pen. The capillary tube 204 through which the writing fluid is expressed also contains a small bore, carbide insert 206 mounted in the end of the capillary tube. The carbide tip prolongs the writing lifetime of the pen due to its high wear resistance.

Mounted within the bore of the housing 200 is a magnetic slug 210 which is biased away from the writing tip of the pen by means of a resilient biasing spring 212. The magnetic slug has a stainless steel filament 214 extending axially from the slug through the spring 212 and into the bore of the capillary tube 204 and the carbide tip 206. As is well known in the art, it is customary to employ a filament connected to a slug within a wetting pen to clean out dried writing fluid and open a channel through which fresh writing fluid can flow when the pen is first used. A pen is generally shaken manually to reciprocate the filament in the capillary tube. Where the plotting pen is mounted securely on a transport mechanism as in the computer controlled plotting device 10, the standard procedure for shaking the pen consists of exciting the Z axis driver 74 and solenoid 76 (FIG 2) several times in rapid succession so that the pivot arm 52 (FIG. 1) moves the pen up and down. Such an exercise produces undesirable wear on the plotting device 10 and can damage the writing tip of the pen as it impinges upon the recording medium 14 and the underlying plotting drum 30.

In accordance with the present invention, an electrical coil 216 is mounted concentrically about the magnetic slug 210 externally of the pen housing 200. When the coil 216 is pulsed repetitively, the magnetic slug 210 is oscillated in the bore of the housing 200 and the filament 214 is oscillated within the capillary tube 204 and carbide tip 206 to clean out the dried writing fluid. In this manner, the oscillations of the slug 210 are generated without damaging the plotting drum and recording medium or the writing tip of the pen.

It will thus be seen that the plotting device 10 is provided with apparatus for expressing writing fluid from the plotting pen 12 at a rate which is proportional to the relative movement between the recording medium and the tip of the pen. The pump 80 is designed so that the flow rate through the pump and the plotting pen is proportional to the pump speed and is driven at a rate proportional to the relative speed of the plotting pen and recording medium. The rate at which the writing fluid is expressed from the pen is, therefore, proportional to the plotting rate, and the quality of the line traces formed at different plotting speeds remains the same. The invention has particular utility in high speed, computer-driven plotting systems where the writing fluid normally employed is ink; however, the disclosed apparatus has an additional advantage in that fluids which are normally too viscous to be employed in conventional plotting pens can be used in the apparatus of the present invention since the writing fluids are forcibly expressed from the plotting pen.

It will be understood that while the present invention has been disclosed in a preferred embodiment, numerous modifications and substitutions can be had without departing from the spirit of the invention. For example, the transporting mechanism which produces relative movement between the pen and the recording medium may be a single or multiple axis mechanism and it is immaterial that the pen or the recording medium moves to produce the relative movement. It is also not essential that the fluid pump have the same construction as the disclosed pump as long as the flow rate of the writing fluid can be accurately controlled in a proportional fashion at the relatively low flow rates of a plotting pen. Accordingly, the present invention has been disclosed in a preferred embodiment merely by way of illustration rather than limitation.

I claim:

1. Apparatus for expressing writing fluid from a plotting pen onto a recording medium while the pen and the recording medium are moved relative to one another in a plotting device in accordance with plotting commands supplied to the plotting device comprising: velocity signal generating means connected with the plotting device for producing a velocity signal representative of the rate of movement of the pen and the recording medium relative to one another in the plotting device; and fluid pumping means connected to the plotting pen and the velocity signal generating means and responsive to the velocity signals for forcing writing fluid from the plotting pen at a flow rate proportional to the rate of movement of the pen and recording medium relative to one another in the plotting device, the fluid pumping means including a fluid piston pump having a rotatably driven drive shaft, fluid displacement pistons, piston drive means interconnecting the shaft and the pistons for displacing at least one piston by an amount directly proportional to the shaft rotation at each rotational position of the shaft and a fluid discharge duct receiving the displaced fluid and connected to the plotting pen; and pump motor means connected to the drive shaft of the pump and to the velocity signal generating means for rotating the drive shaft at a rate proportional to the velocity signal.

2. Apparatus for expressing writing fluid from a plotting pen as defined in claim 1 wherein the velocity signal generating means includes a rate sensing circuit connected to receive the plotting commands supplied to the plotting device.

3. Apparatus for expressing writing fluid as defined in claim 1 wherein the piston drive means comprises drive cams interconnecting the rotatably driven drive shaft and the pump pistons.

4. Apparatus for expressing writing fluid as defined in claim 3 wherein the rotatably driven drive shaft is connected between the pump motor and the drive cams, and the drive cams are rotatable in the pump and have cam profile segments selected to displace the pistons within the cylinders by amounts directly proportional to rotation of the drive shaft.

5. In a plotting device in which a plotting head and a recording medium are moved relative to one another along first and second mutually perpendicular axes in response to plotting commands supplied to first and second transport mechanisms associated respectively with the relative movements of the head and the recording medium along the first and second directions, the improvement comprising: first drive motor means connected in the first transport mechanism for receiving plotting commands and actuating the first transport mechanism; second drive motor means connected in the second transport mechanism for receiving plotting commands and actuating the second transport mechanism; first rate sensing means for providing a first rate signal representative of the relative movement of the head and recording medium along the first axis; second rate sensing means for producing a second rate signal representative of the relative movement of the head and the recording medium along the second axis; computing means connected with the first and the second rate sensing means for producing a rate signal representative of the combined rates of relative movement of the head and recording medium along the first and second axes; a writing fluid reservoir; a plotting pen mounted to the plotting head and having a writing tip carried by the plotting head in close proximity to the recording medium; a piston pump connected between the writing fluid reservoir and the plotting pen and having a drive train including a pump drive shaft and means for displacing the individual pistons in the pump in direct proportion to the shaft rotation or fraction thereof while the pistons are expelling fluid from the pump; and pump drive means connected to the computing means and drive shaft of the pump for controlling the pump to produce a flow of writing fluid from the writing tip of the recording pen at a flow rate proportional to the rate signal from the computing means.

6. In a plotting device, the improvement as defined in claim 5 wherein: the first rate sensing means has an input receiving plotting commands received by the first drive motor means; and the second rate sensing means has an input receiving plotting commands received by the second drive motor means.

7. In a plotting device, the improvement as defined in claim 5 wherein the plotting pen has a capillary tube forming the writing tip of the pen, a writing fluid supply conduit connected with the fluid pump and a housing having a bore leading from the writing piston supply conduit to the capillary tube.

8. In a plotting device, the improvement as defined in claim 5 wherein the writing piston reservoir and the fluid pump are mounted to the plotting head with the plotting pen.

9. In a plotting device, the improvement as defined in claim 5 wherein the drive train of the pump has at least two rotatable drive cams mounted on a common axis and two cam-operated pumping pistons associated respectively with the two drive cams, and two drive cams each having cam profile segments subtending arcs about the common axis greater than 180° and providing positive piston displacements directly proportional to the cam rotations, the cams being mounted on the common axis and rotated together so that at least one of the cam profile segments displaces an associated piston during each phase of the cam rotations.

10. In a plotting device, the improvement as defined in claim 9 wherein the pump drive means includes a pump motor driven at a speed proportional to the rate signal from the computing means and connected in driving relationship with the two rotatable drive cams.

* * * * *